Nov. 7, 1933.  F. L. CONE  1,934,620
MULTIPLE SPINDLE AUTOMATIC LATHE
Filed June 29, 1931   17 Sheets-Sheet 1

Nov. 7, 1933.   F. L. CONE   1,934,620
MULTIPLE SPINDLE AUTOMATIC LATHE
Filed June 29, 1931   17 Sheets-Sheet 4

Nov. 7, 1933.    F. L. CONE    1,934,620
MULTIPLE SPINDLE AUTOMATIC LATHE
Filed June 29, 1931    17 Sheets-Sheet 5

Inventor
Frank L. Cone
by Wright Brown Quinby & May
Attys

Nov. 7, 1933.  F. L. CONE  1,934,620
MULTIPLE SPINDLE AUTOMATIC LATHE
Filed June 29, 1931  17 Sheets-Sheet 8

Inventor
Frank L. Cone
by Wright, Brown, Quinby & May
Att'ys

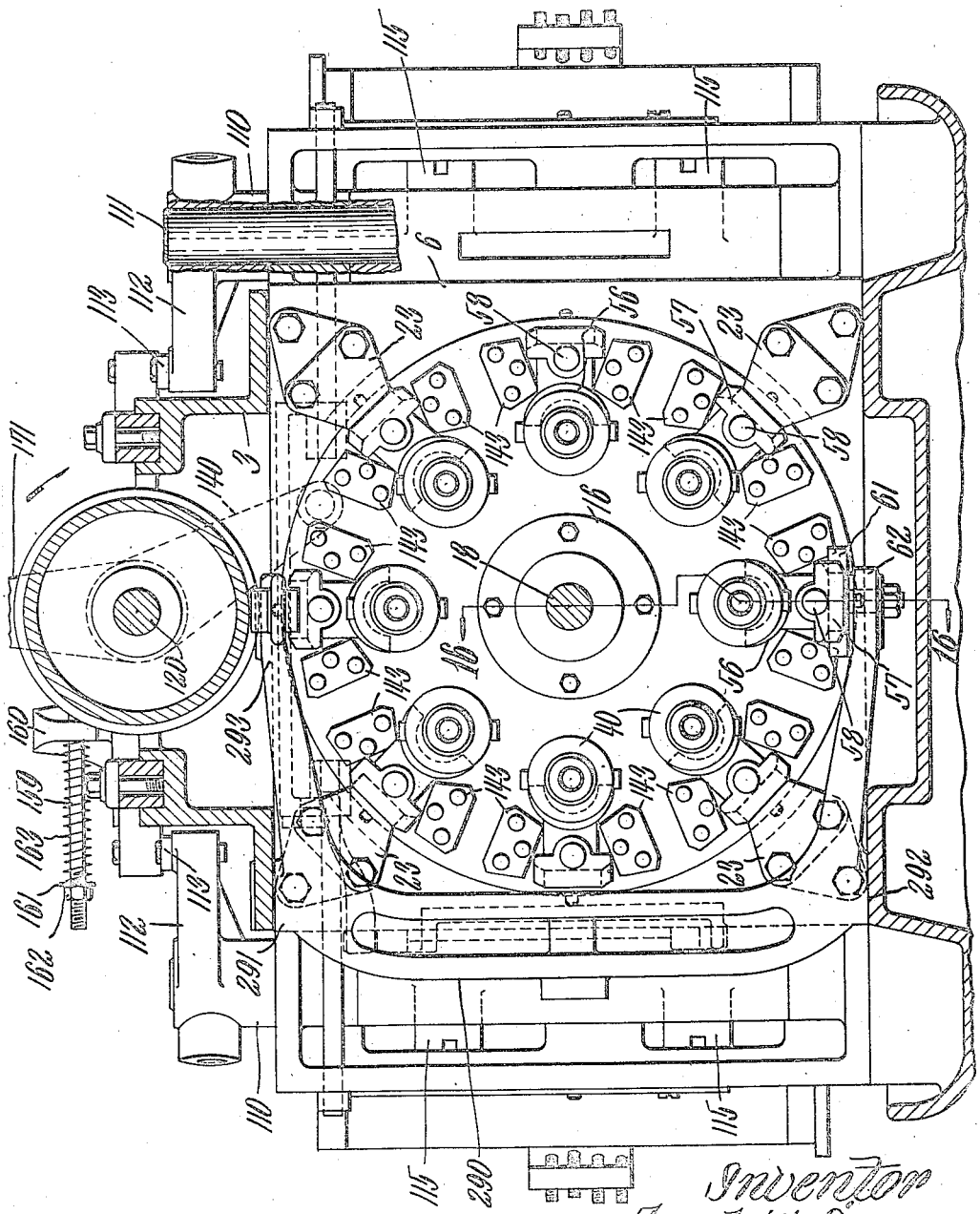

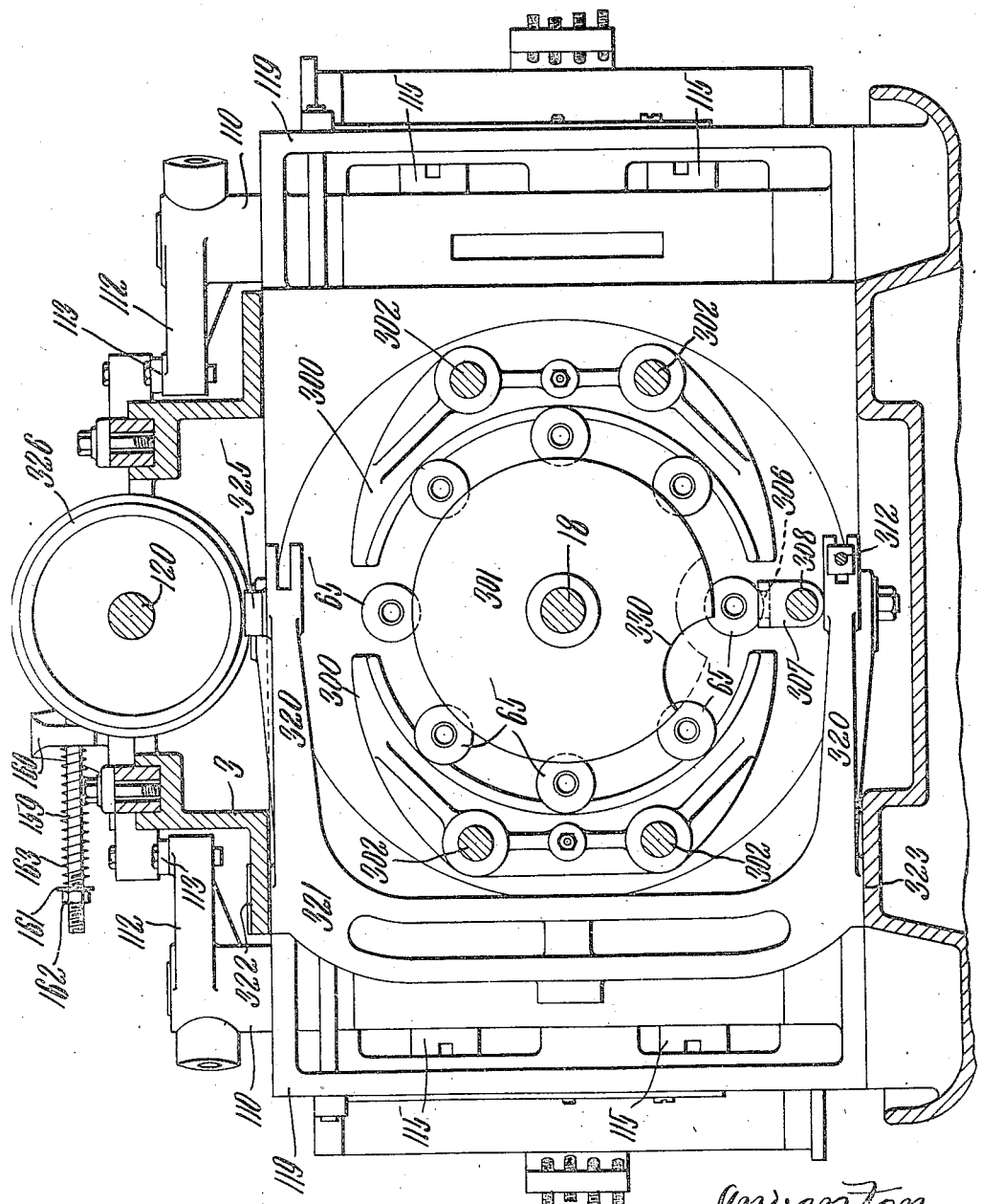

Nov. 7, 1933.  F. L. CONE  1,934,620
MULTIPLE SPINDLE AUTOMATIC LATHE
Filed June 29, 1931  17 Sheets-Sheet 11
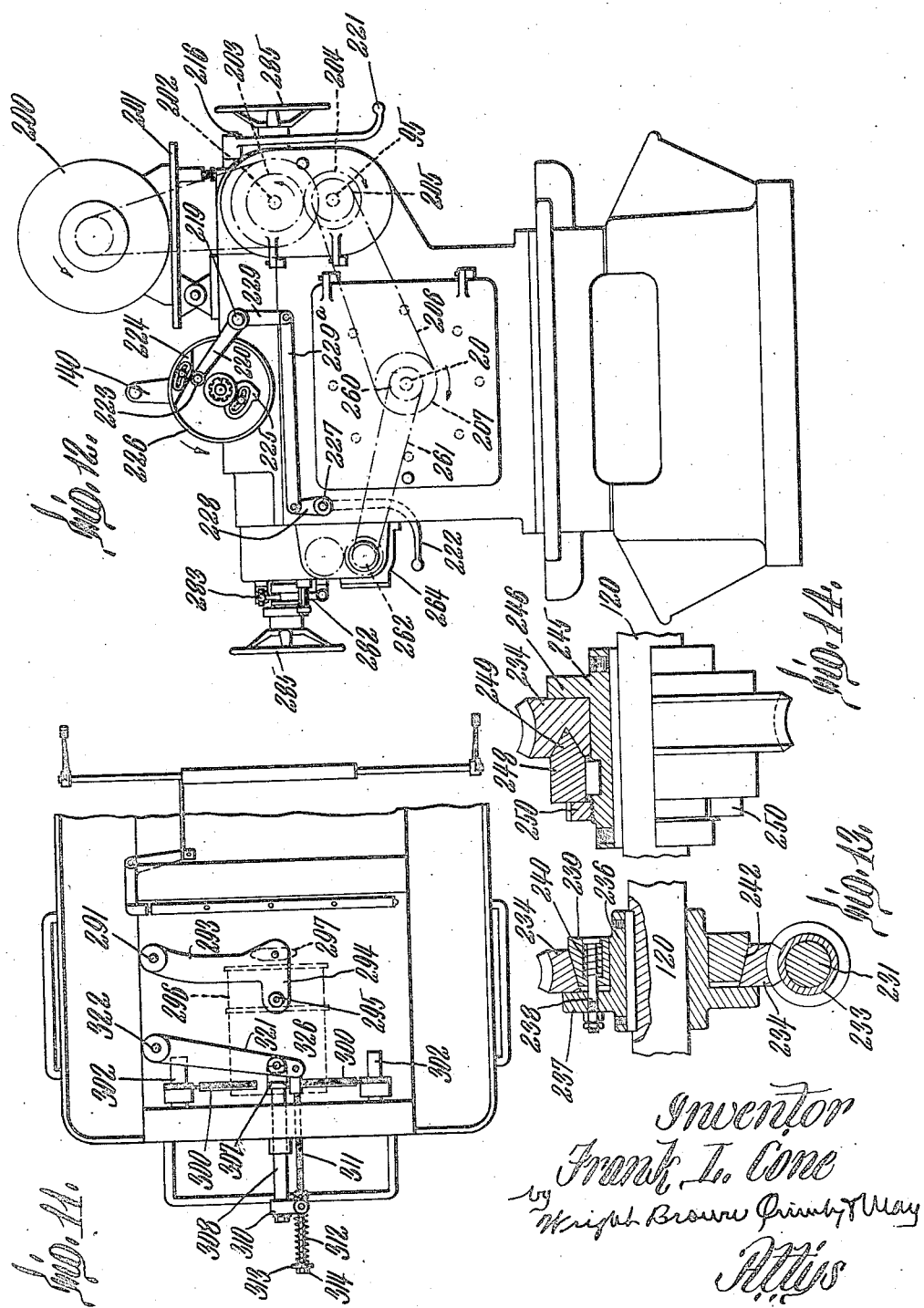

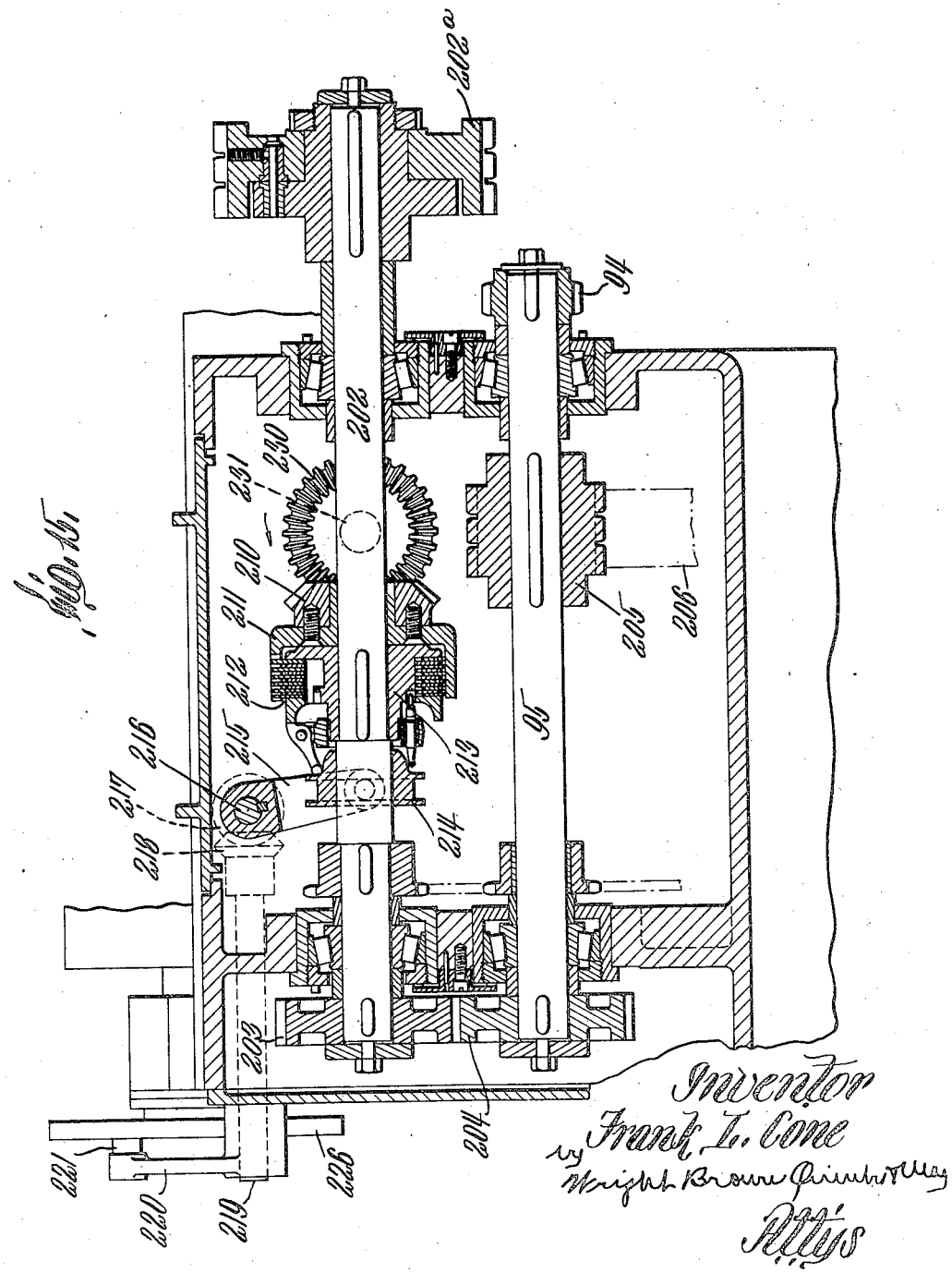

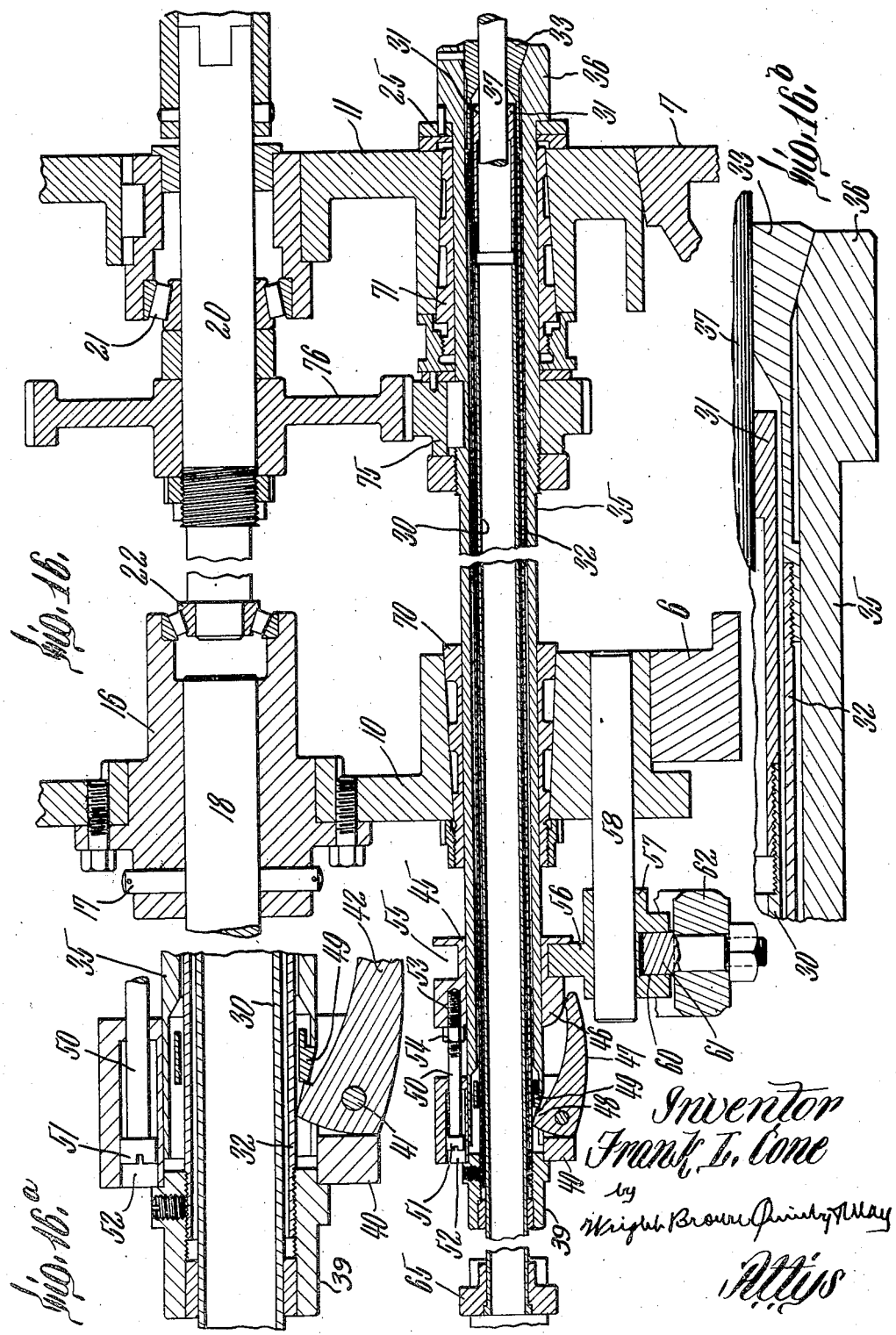

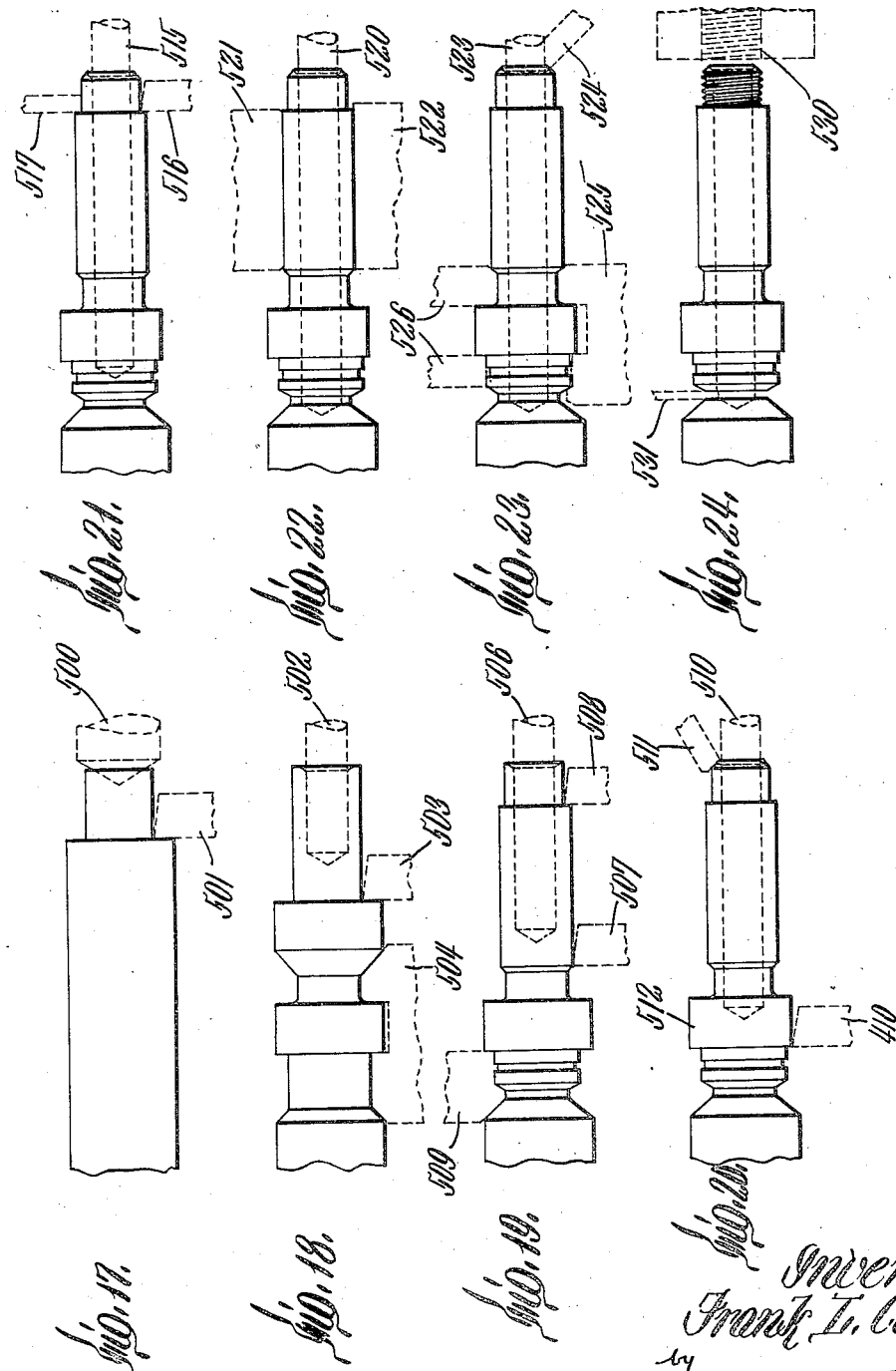

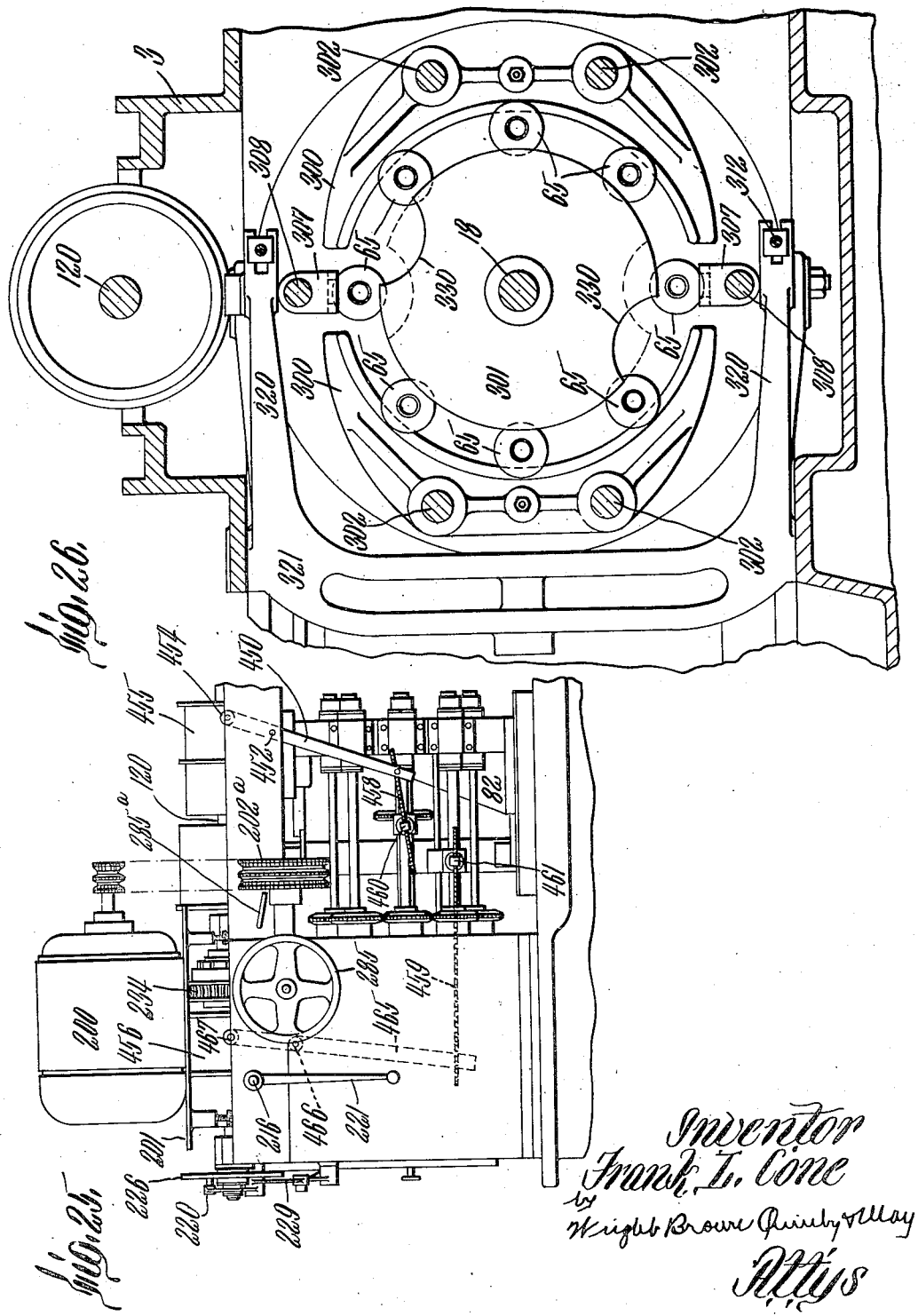

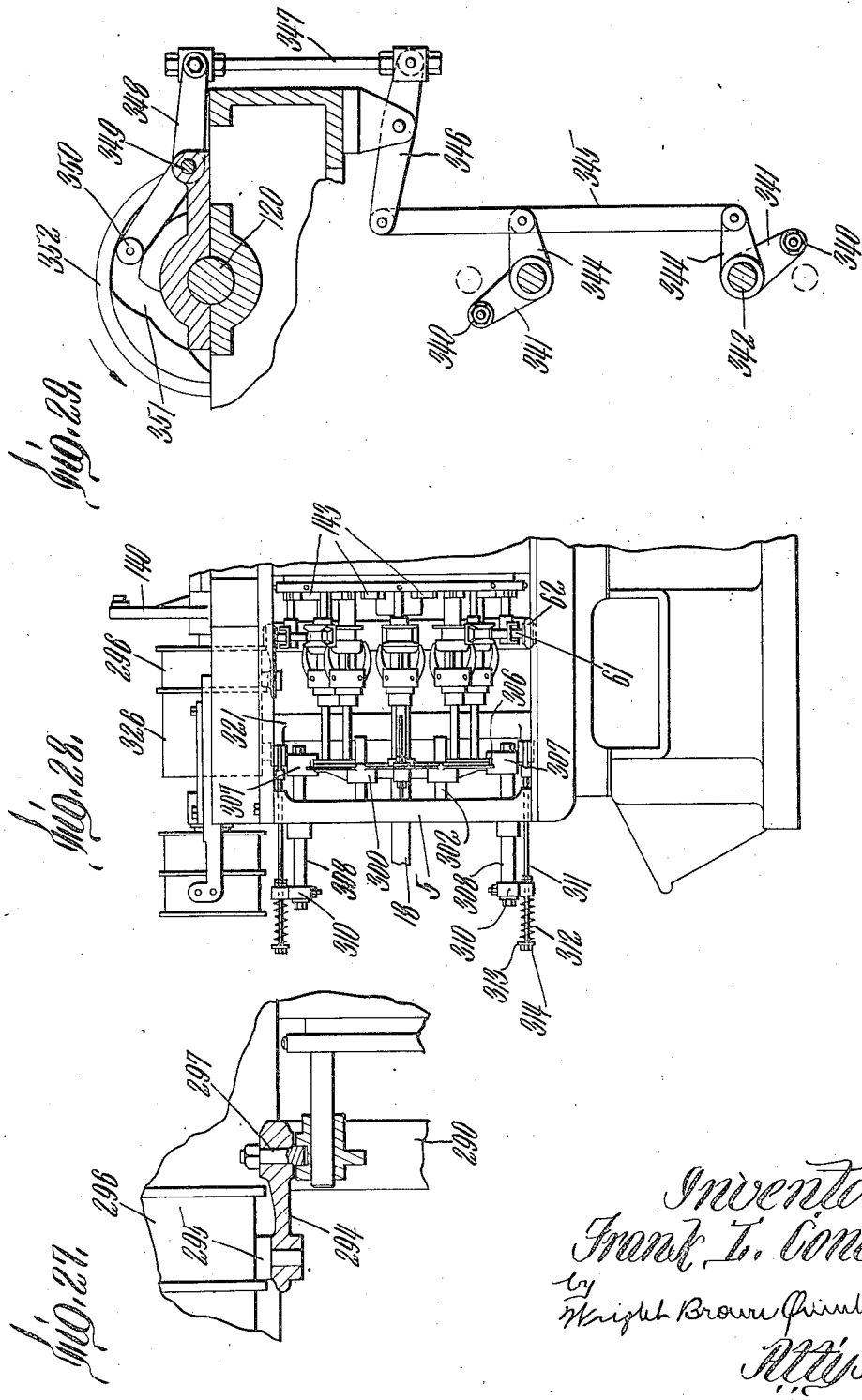

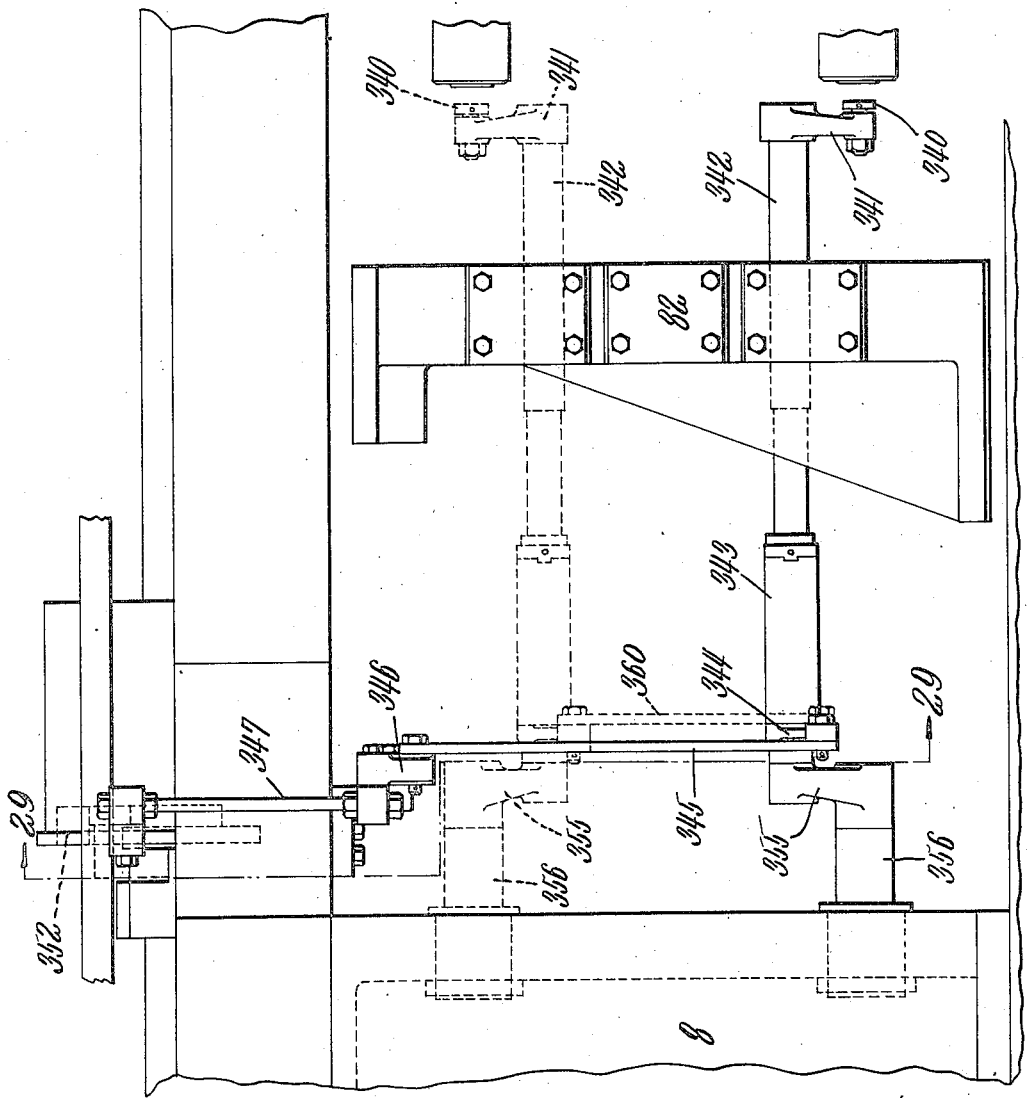

Patented Nov. 7, 1933

1,934,620

UNITED STATES PATENT OFFICE 1,934,620

MULTIPLE SPINDLE AUTOMATIC LATHE

Frank L. Cone, Windsor, Vt.

Application June 29, 1931. Serial No. 547,544

11 Claims. (Cl. 29—37)

This invention relates to lathes of the automatic multiple spindle type. One object of this invention is to provide an improved cam control for the cycle of operations of the machine producing simple and direct action of the parts with a minimum opportunity for inaccuracy due to lost motion or other cause and to position the control mechanism where it is out of the way and is not subject to derangement or interference by chips resulting from the various cutting operations.

A further object is to provide an improved indexing mechanism.

A further object is to provide an improved driving means for the tool spindles whereby speed and direction variations are facilitated.

A still further object is to improve the work feeding mechanism so that it is positive in action and is not dependent on springs.

Yet another object is to provide a multiple spindle machine convertible so that when the operations to be performed are many, a complete cycle is performed in each complete rotation of the indexing drum, but where the operations are not too many or involved the complete cycle is performed in a part only, such as one-half of, the complete rotation of the drum.

A further object is to provide a construction by which eccentric or other unsymmetrical forms may be cut when desired.

Further objects and advantageous constructions will appear from a more complete description of certain embodiments of the invention shown in the accompanying drawings in which Figure 1 is a front elevation of the machine.

Figure 1:
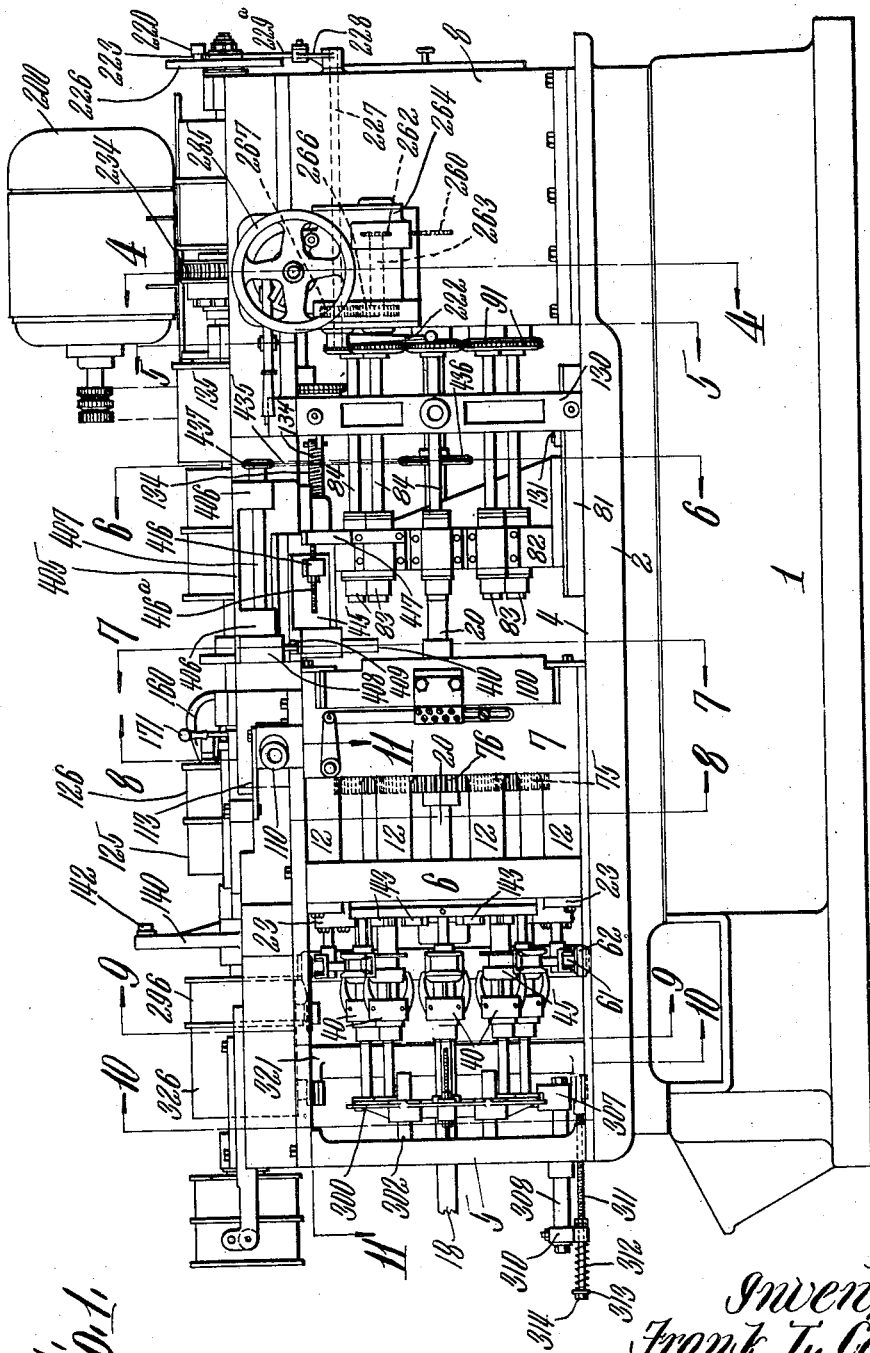

Figures 4 to 11 inclusive are sections on the correspondingly numbered section lines of Figure 1.

Figure 12 is a driving end elevation of the machine.

Figure 13 is a fragmentary section through a driving connection.

Figure 14 is a view partly in elevation and partly in section showing a modified form of driving connection.

Figure 2:
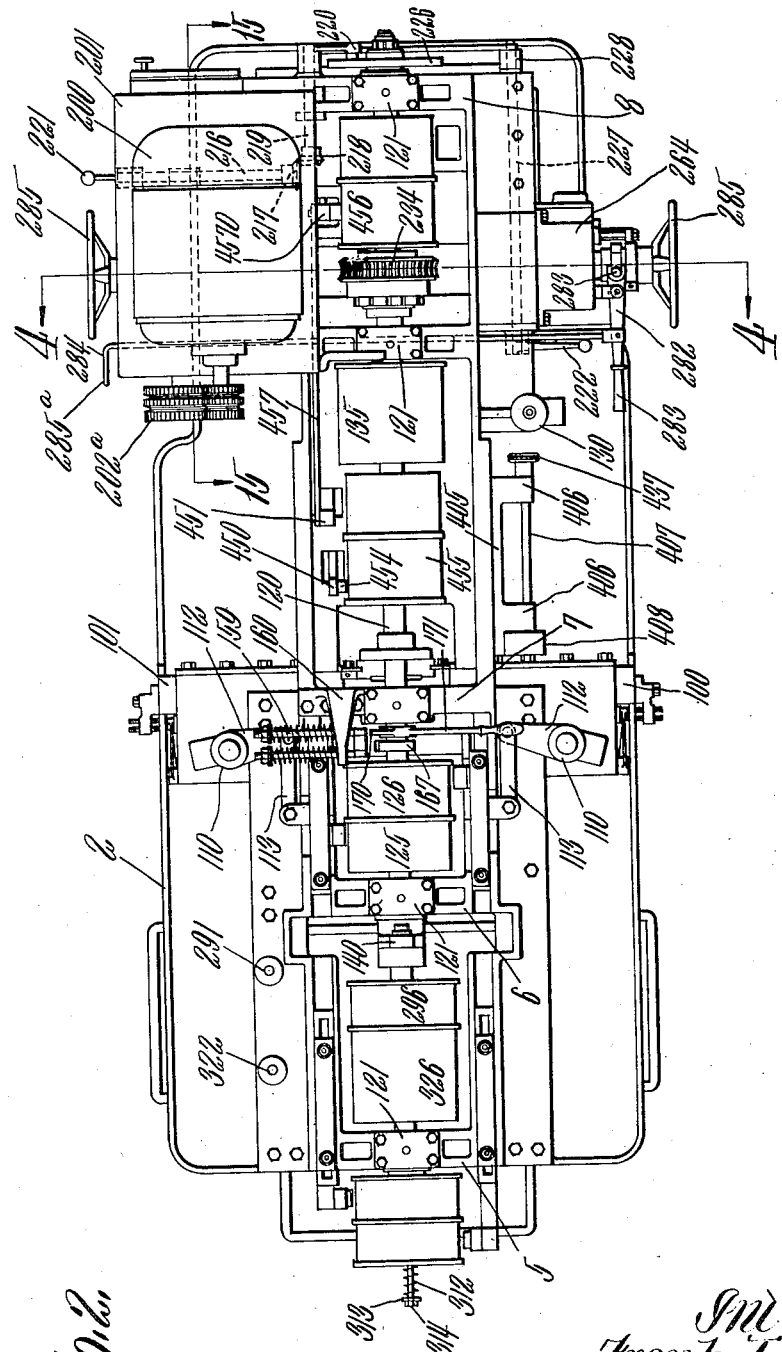
Figure 2 is a top plan of the same.

Figure 15 is a section on line 15—15 of Figure 2.

Figure 16 is a detail section through a work spindle and related parts.

Figures 16a and 16b are fragmentary views similar to portions of Figure 16 but to a larger scale.

Figures 17 to 24 are diagrammatic views showing successive operations which may be performed by the machine to make a certain product shown completed in Figure 24.

Figure 25 is a fragmentary rear elevation of the machine showing actuators for certain of the tools.

Figure 26 is a view similar to a portion of Figure 10 but showing the machine equipped to perform the complete cycle in four stations instead of eight, the machine being then what might be termed a double four.

Figure 27 is a view partly in elevation and partly in section of a portion of the work feed control mechanism for the double four machine.

Figure 28 is a fragmentary front elevation of a double four machine.

Figure 29 is a detail partly in section showing parts of the work stop mechanism for the double four machine.

Figure 30 is a fragmentary side elevation showing the work stop mechanism for the eight and the double four spindle machine.

Figure 3:
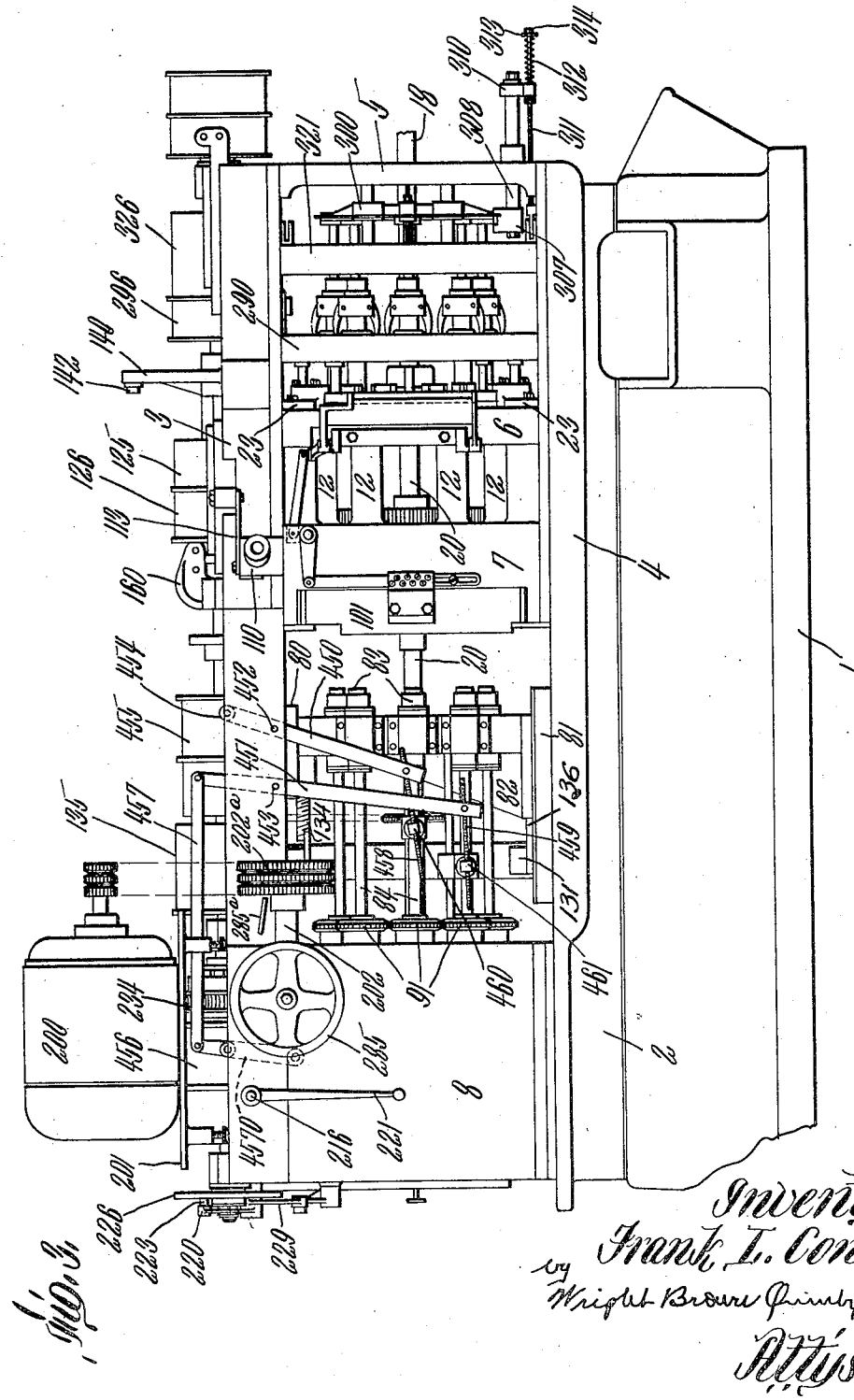
Figure 3 is a rear elevation.

Referring first to Figures 1, 2 and 3, it will be seen that the machine comprises a bed 1 carrying a frame 2, this frame comprising horizontal upper and lower members 3 and 4, respectively, supported by suitably spaced frame portions 5, 6, 7 and 8. The frame members 6 and 7 are each provided with a circular opening within which is rotatable end wall members 10 and 11 (see Figure 16) of a rotatable drum, these end wall members 10 and 11 being connected by longitudinal ribs 12 (see Figures 1 and 3). This drum is therefore mounted to turn about a horizontal axis. Its end wall 10, as shown in Figure 16, is provided with a central hub portion 16 in which is fixed as by means of a pin 17 the end of a shaft 18. This shaft extends outwardly beyond the end wall 5 of the machine and may have coupled thereto the usual stock reel with which machines of the multiple spindle type are commonly provided and by which the several pieces of bar stock passing to the several work holders are supported with capability of turning with the drum as the drum is indexed from station to station. In axial alinement with the shaft 18 is a rotary shaft 20 which is journaled as in ball bearings 21 in the drum end 11. The inner end of this shaft 20 is provided with a thrust roller bearing 22 at the inner end of the hub 16 of the drum end 10. The drum may be held in position by retaining brackets 23 (see Figure 9) secured to the frame member 6 and overlying the adjacent drum face 10.

Work holding spindle

Arranged about the axis of the shafts 18 and 20 are a plurality of rotatable work holders at 25 for receiving bar stock, and as shown in the drawings of this application eight such work holders are provided. As shown in Figures 16, 16a and 16b each of these work holders comprises an inner stock feeding tube having a stock gripper 31 at its forward end outwardly of the drum plate 11, a collet carrying tube 32 outwardly of the stock feed tube and carrying a spring collet 33 at its outer end, and an outer tube or work spindle 35 having a collet hood 36 at its forward end with which the collet 33 cooperates when pulled rearwardly to grip the bar stock shown at 37 in Figure 16. By moving the collet rearwardly or to the left, as shown in Figure 16, the work is clamped, the spring fingers of the collet being brought together through their engagement with the collet hood, and by moving the collet in the opposite direction, or to the right in Figure 16, the work is released. In Figures 16, 16a and 16b the collet is in work gripping position and the work feeder is at the limit of its work feeding movement. Rearwardly, or to the left of the drum end 10, the collet tube has fixed thereto a sleeve 39 forming an abutment for a block 40 to which is fulcrumed as at 41 levers such as 42, preferably there being three such levers equally angularly spaced about the axis of the tubes. Axially slidable on the hood tube or work spindle 35 is a collar 45 having at one end a cam face 46 which may be moved in under an arm 47 of each lever 42 extending in general parallel to the axis of the tubes, and by engagement with which these lever arms are rocked outwardly to bring their inner short arms 48 into contact with a ring wear piece 49 at the end of the work spindle 35. This causes the block 40 to be forced rearwardly away from the adjacent end of the work spindle 35, thus drawing the collet rearwardly and tightening it upon the stock 37. The collar 45 has, however, a lost motion positive connection with the block 40, this, as shown, being formed by screws as 50 having their heads 51 riding in sockets 52 in the block 40 and having their threaded ends 53 engaged in suitable threaded sockets in the collar 45.

A lock nut 54 on each of these screws may be used to fix the screw in desired axial position so that at the limit of its lost motion, which is beyond the range of motion where multiplying wedge connection from the lever arms 42 and the cam face 46 is effective, its head 51 acting as a stop engages on the base of the socket 52 as the collar 45 is moved to the right as viewed in Figure 16. Further motion causes the block 40 to be moved therewith and this moves the collet 32 positively to the right with relation to the collet hood and permits its spring fingers to free themselves from the stock.

Each collar 45 is provided with a peripheral groove 55 in which is engaged a finger 56 on a slide 57 carried on a post 58 extending rearwardly from the drum end plate 10. This block or slide 57 is provided at its opposite side from the tongue 56 with a groove 60 in which at suitable times in the indexing motion of the drum a shoe 61 on an actuating arm 62 may be engaged this being described later. The stock feeding tube 30 extends beyond the block 40 and has fixed thereto a head 65 by which it may be actuated at suitable times as will later more fully appear. Each spindle 35 is journaled for rotation in bearings 70 and 71 in the drum plates 10 and 11 and adjacent to the drum plate 11 each of these spindles has fixed thereto a gear 75, all these gears meshing with a central gear 76 carried by the shaft 20. Thus by rotation of the shaft 20 all of the work holders comprising the concentric tubes carrying the collet hood, the collet and the work feed may be rotated, thus to rotate the bar stock as it is presented to the tools as will later appear. The drum 10 is also indexed so as to present each of these work holders in succession in the same angular position about the axis of rotation of the drum.

Rotary tool carriers

The upper and lower frame members 3 and 4 are provided with suitable longitudinally extending ways 80 and 81 for the slidable reception of a carriage 82 which has journaled therein a plurality of rotatable tool holders or spindles 83 also arranged in circular series about the axis of rotation of the drum, and spaced in general corresponding to the spacing of the work holders in the drum. Each of these spindles has fixed thereto an actuating shaft 84, these actuating shafts extending rearwardly and axially slidable within the frame member 8, the inner face of which is formed as a plate 86 provided with bosses 87 (see Figure 4) centrally apertured for the passage of each shaft 84.

Figure 5:
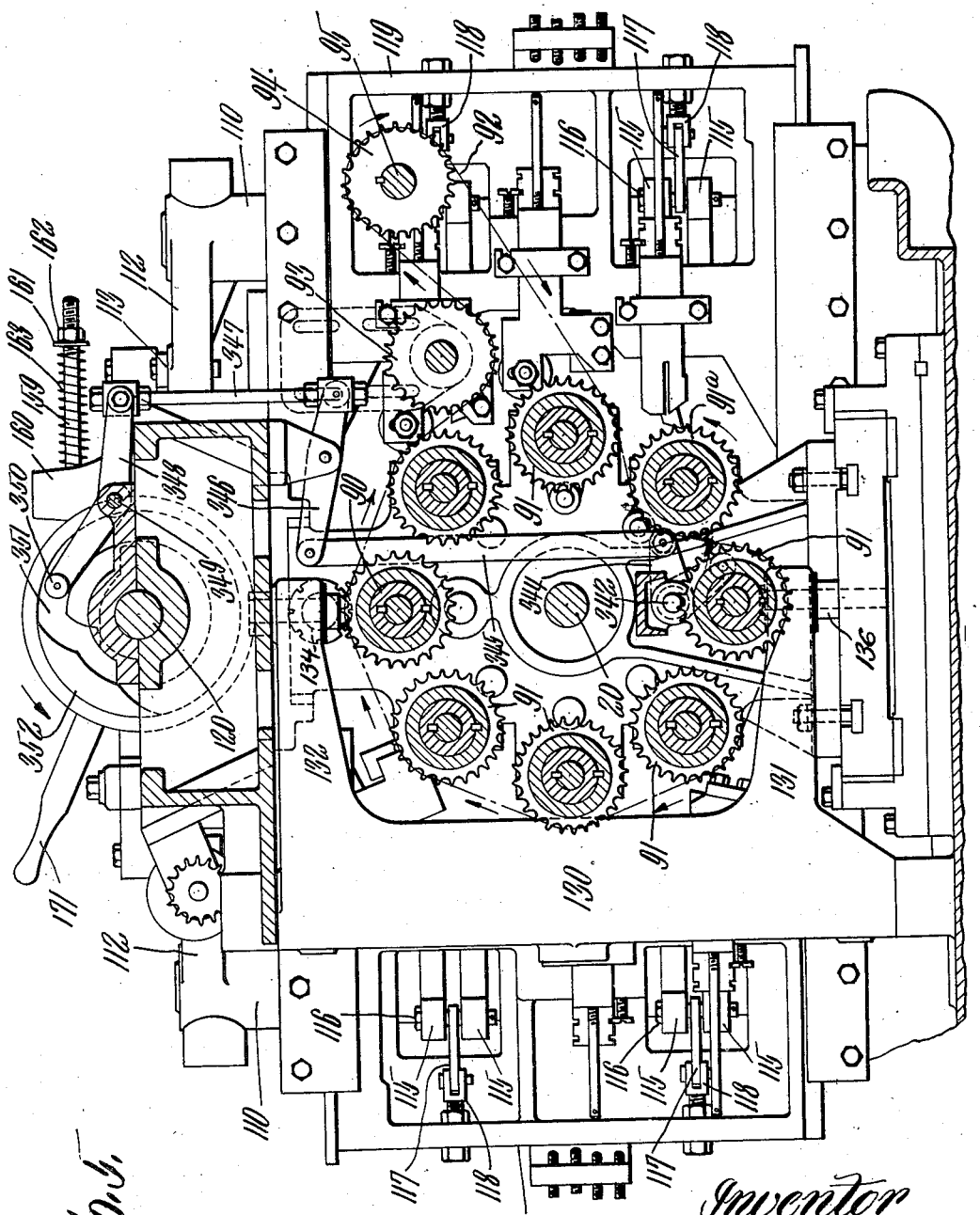

Inwardly of the frame plate 86 each of these shafts 84 has keyed thereto a sleeve 90 journaled in the end plate 86 of the frame member, this sleeve in turn having keyed thereto the hub of a sprocket wheel 91. By rotation of this sprocket wheel, therefore, it will be evident that each one of the tool spindles may be rotated and that the tool spindles may be moved axially by movement of the slide 82. These tool spindles are formed to have attached thereto tools such as drills, reamers, grinders, screw thread dies, or the like, which it is desired to rotate when being presented to the work. As shown in Figure 5 they may be rotated as by means of an endless chain 92 which may be passed thereabout in sequence, this chain passing beneath an idler sprocket 93 and about a sprocket 94 on a countershaft 95 driven as will later be described. As shown in Figure 5 this chain passes about the inner face of the sprocket 91a while it passes about the outer faces of all the other sprockets. This will cause the sprocket 91a to be driven in the reverse direction to the others and in the same direction as the work spindles but at a slower rate. The rotary tool holder rotated by this sprocket 91a therefore rotates in the opposite direction to all the others. This may be desirable as, for example, where it is desired to thread work being rotated by the work holder presented thereto, the rotation which is effective in causing the die to thread being the differential of the rotations of the work and the die. By this means the die may be fed on at the desired relatively slow speed, while those tools which it is desirable to operate at high speeds may be driven in the reverse direction to that of the die and the work spindles and thus having the effective speed of the summation of the speeds of rotation of the work and the rotation of the tool. This is suitable for drills or the like.

Front and back tool carriers

Figure 6:
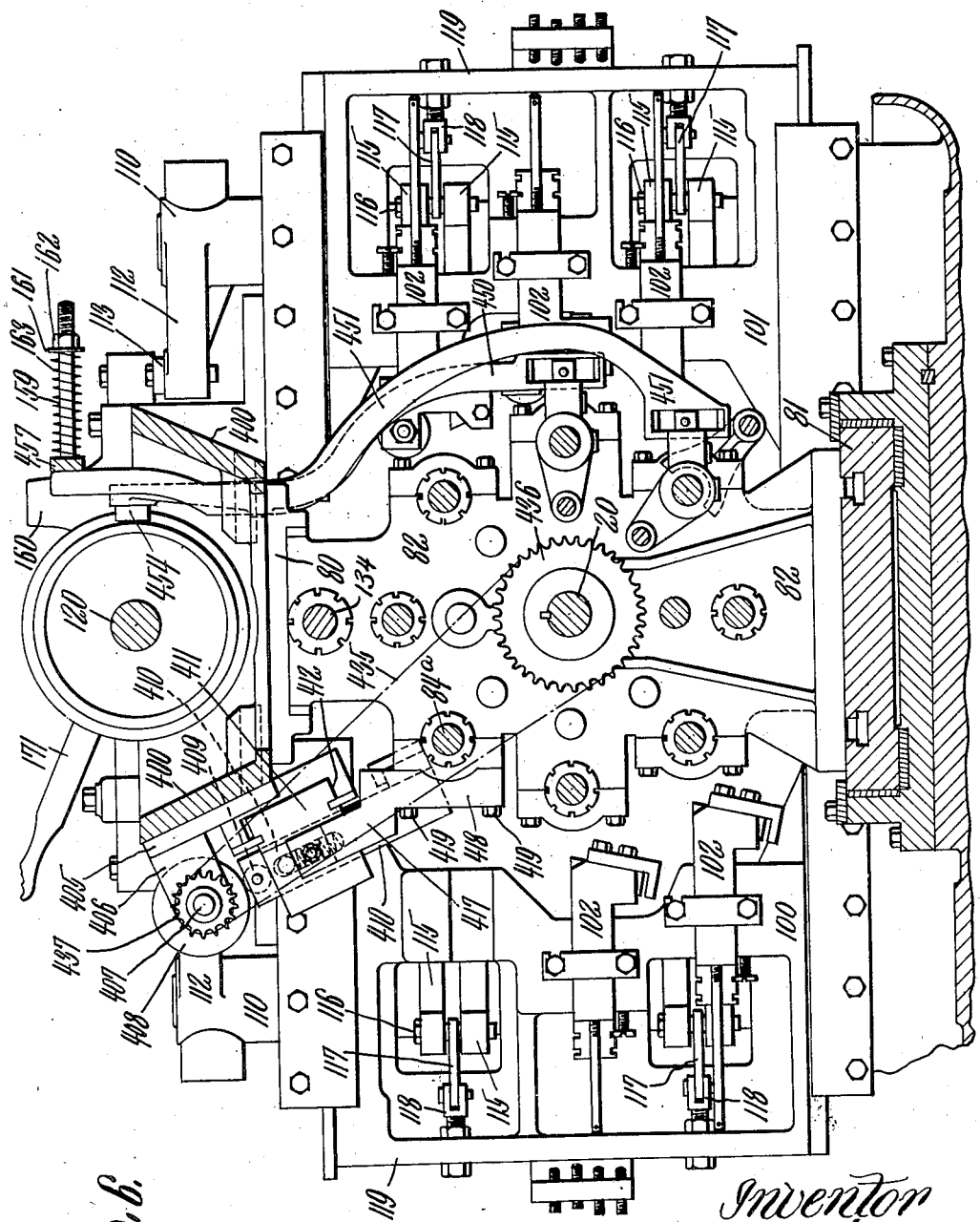

The frame member 7 also provides means for supporting a pair of tool slides 100 and 101 (see Figures 1, 3 and 6). These tool slides may be provided with tool holders such as 102 which may carry various turning tools in position to operate on the work, such tools being shown as positioned to operate on two pieces of work on the forward slide 100 and three pieces of work on the rear slide 101. If desired, however, a third tool bar may be carried by the slide 100 for operating on a third piece of work. Thus it will be seen that work at six different stations of the drum may be operated on simultaneously by tools on the front and back work slides where this may be found desirable.

Figure 8:
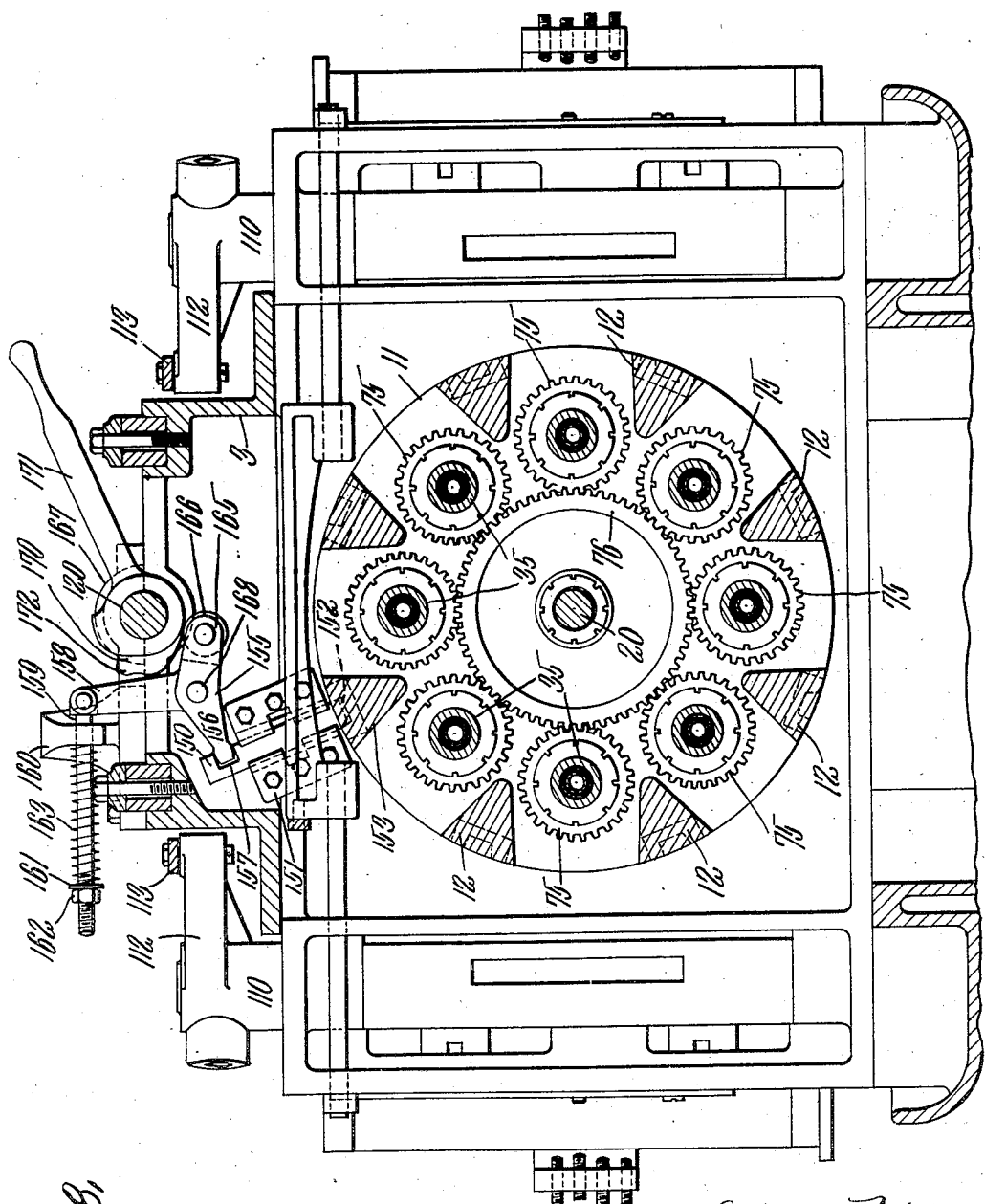

These front and back work slides may be actuated by any suitable means, but as herein shown this movement is accomplished by the use of rocking members 110 best shown in Figures 6, 8 and 9. As shown in Figure 9, each of these members 110 comprises a tubular casting fixed to a vertical shaft 111 to the upper end of which is fixed an arm 112. To the inner end of the arm 112 is pivoted a link 113 actuated by a cam mechanism as will later appear. The member 110 is provided with arms 115 arranged in pairs to support pivot bolts 116 which are connected by means of links 117 with the yoke members 118 adjustably secured as by threaded engagement therewith with the outer walls 119 of the slides 100 and 101. The inner limits of motion of these slides may be independently determined for each indexed position of the drum by stops such as are fully described and claimed in my Patent No. 1,716,303 granted June 4, 1929, for Tool stop for automatic screw machine. A portion of this mechanism is shown in Figures 1, 3 and 11.

The movement of the three tool slides 82, 100, and 101 may be controlled by suitable cams on an overhead cam shaft 120. This cam shaft is arranged above the drum and substantially parallel to its axis and is journaled in suitably spaced bearings 121 in the upper frame member 3. By removing the bearing caps for the bearings 121 this cam shaft may be lifted off the machine freely. This facilitates changing of cams, and by providing a plurality of such shafts cams for one set up may be applied to one while the machine is in operation for another set up and the change may be made to the new set up when this is desired with little loss of time. As shown best in Figure 2 the front and rear tool carriers 100 and 101 are actuated through the links 113 by cams on drums 125 and 126, respectively. The tool slide 82 is actuated by the rocking of a vertically journaled rock member 130 (see Figures 1, 2, 5 and 25), the lower and upper arms 131 and 132 being connected to upper and lower portions of the slide 82. The upper of these connections is shown as including a threaded link member 134 which permits accurate adjustment of these connections to maintain the slide 82 in the desired vertical relation. The upper arm 132 also extends upwardly and has a cam follower at its upper end controlled by cams on the drum 135 also fixed to the cam shaft 120. The lower arm 131 is connected to the tool slide by the link 136.

Indexing mechanism

The cam shaft 120 is also provided with means for indexing the drum carrying the rotary work spindles. To this end it has fixed thereto a crank arm 140 having a cam follower roll 142 at its outer end which may be engaged between abutment plates 143 arranged in pairs on the rear face of the drum plate 10. As the cam shaft 120 is rotated this cam follower 142 passes down between one pair of plates 143 and as the crank arm continues its rotation the drum is moved through an eighth of a revolution whereupon the cam follower 142 moves out of contact with the plates 143 so that the drum remains stationary for a substantial portion of its angular movement until the follower 142 engages between the succeeding pair of plates 143 whereupon the drum is indexed a further step.

Means are provided for locking the drum in any indexed position between indexing motions. As shown best in Figure 8 this comprises a latch bar 150 slidable between guides 151 fixed to the upper frame member 3, the lower end of this latch bar engaging between indexing motions in a latch socket 152 in one of the block portions 153 on the inner face of the drum plate 11. This latch 150 is actuated by a three-armed lever 155, one arm 156 of which engages in a notch 157 in the latch bar and another arm 158 of which has pivoted thereto a rod 159 which extends through a fixed bracket 160. Between this bracket 160 and a washer 161, held in adjusted position by a nut 162 on the outer threaded extremity of the rod 159, is a coil spring 163 which acts to press the latch bar 150 downwardly into latching position whenever this is permitted. The third arm 165 of the lever 155 carries a cam follower 166 with which engages a cam 167 fixed to the cam shaft 120. This lever 155 is shown as fulcrumed on a pin at 168. The cam 167 is so designed that just before the indexing is to occur the arm 165 is depressed and the latch 150 is retracted but as soon as the indexing is complete the cam 167 permits the spring 163 to return the latch to latching position.

It may sometimes happen, however, that it is desirable to release the latch by hand so that the drum may be turned without reference to the indexing mechanism, as, for example, in making adjustments or in initially setting up the machine. To this end a cam 170 is shown as journaled on the cam shaft 120, this cam 170 having a cam hump 172 which can be brought into contact with the follower 166 to depress this follower and retract the latch and this may be done by manipulation of the handle 171 with which the cam 170 is provided.

Drive mechanism

The cam shaft 120, the work holders, and the tool spindles may all be driven by power and to this end a motor has been illustrated at 200 seated on a platform 201 at the upper portion of the machine above the frame portion 8. Of course any other suitable means may be provided for driving the machine. The drive, however, is taken from this motor or other suitable driving source through a sprocket 202a on a main drive shaft 202 which is shown as positioned at the back of the machine and somewhat below the level of the cam shaft 120. This main drive shaft 202 may be geared through intermeshing gears 203 and 204 with the countershaft 95 from which the tool spindles are driven through the endless driving chain 92 as previously described. The countershaft 95 is also provided with a sprocket wheel 205 from which a chain 206 extends to a sprocket wheel 207 fixed to the shaft 20 by which the work holders are rotated as previously described.

The main drive shaft 202, as shown in Figure 15, has journaled thereon a bevel gear 210 which has secured thereto one element 211 of a ring clutch 212, another element 213 of which is keyed to the shaft 202. At 214 is shown a clutch-actuating collar slidable on the shaft 202 to clamp or release the clutch rings by axial motion of this collar 214. It is shown as actuated by a bifurcated shift arm 215 fixed to a rock shaft 216, this rock shaft being actuated through intermeshing bevel gears 217 and 218 by a rock shaft 219. This rock shaft 219 has a crank arm 220 fixed to its outer end carrying a cam follower 223 in position to be actuated by suitable speed control cam elements 224 and 225 secured to a cam drum 226 at one end of the cam shaft 120. The clutch 212 may be actuated by hand at the back of the machine by rocking a handle 221 fixed to the outer end of the shaft 216 and may be actuated from the front of the machine by rocking a handle 222 fixed to a rock shaft 227 connected through crank arms 228 and 229 connected by a link 229a.

The bevel gear 210 meshes with a similar gear 230 on a cross shaft 231 (see Figure 4) which carries intermediate its ends a worm 233 meshing with a worm wheel 234 in driving relation with the cam shaft 120. Preferably, however, it is so connected thereto that it is unable to transmit more than a predetermined driving stress so that in case the cams are not initially correctly arranged so that jamming of the parts would occur, the worm will slip on the shaft so that breakage of the parts will not result. In Figures 13 and 14 two constructions are shown by which this may be accomplished. In Figure 13 the cam shaft 120 is shown as having keyed thereto a sleeve 236 having a circular flange 237 thereon. This flange carries a series of bolts 238, the heads of which ride in sockets in a ring 239 having a frusto-conical outer face, springs such as 240 acting to press this ring axially into engagement with the inner mating beveled face 242 of a ring in which are cut the worm teeth for the worm 234. Under abnormal driving stress this worm wheel ring can remain stationary against the frictional drag exerted thereon by the rotary flange 237 and the collar 239. In Figure 14 the cam shaft 120 is shown as having fixed thereto a collar 245 having a circular flange 246 thereon against which is pressed the worm ring 234 by a follower ring 248 keyed to the sleeve 245 and having a tapered friction face 249 engaging a mating grooved face in the worm ring 234, an adjustment ring 250 threaded on the outer end of the sleeve 245 being employed to regulate the pressure with which the flange 246, the ring 248 and the worm wheel ring 234 are clamped together.

When the shaft 231 is clutched to the drive shaft 202 the cam shaft is driven at a relatively high speed. When this cam shaft is unclutched from the high speed drive a low speed drive may be effective to drive it at a lower speed. This low speed drive is derived from the countershaft 95 through the shaft 20 by which the tool spindles are rotated.

Figure 4:
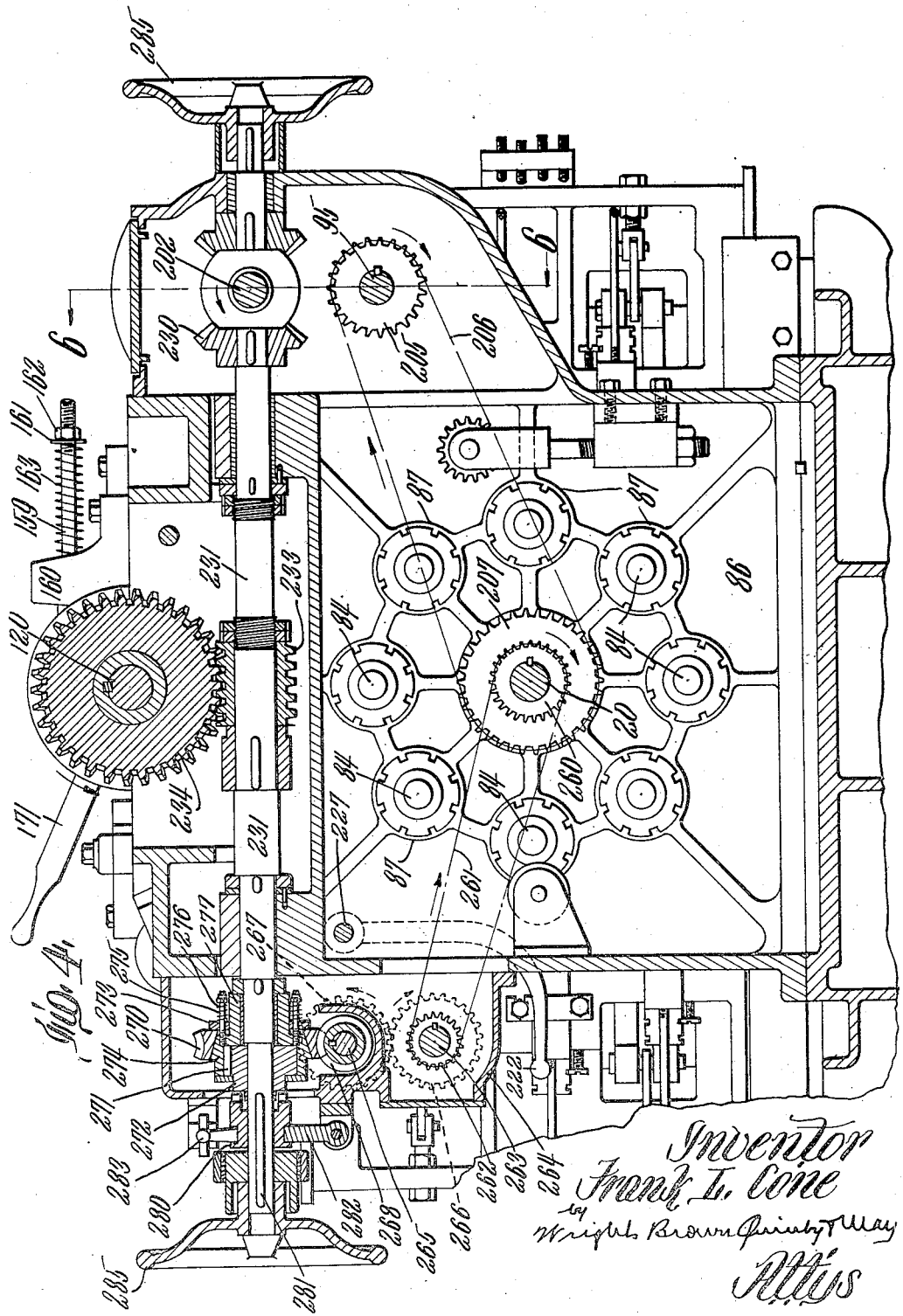

As shown in Figure 4 the shaft 20 carries a sprocket wheel 260 from which extends a drive chain 261 about a sprocket wheel 262 fixed to a shaft 263. This shaft 263 is carried in the casing 264 on the forward face of the machine frame member 8 and is geared to a shaft 265 through change gears 266 and 267. The shaft 265 carries a worm 268 which meshes with a worm ring gear 270. This gear 270 is connected to the shaft 231 through an overrunning roller clutch at 271 which permits the shaft 231 to be driven by the high speed drive freely but when the high speed drive is not in operation it automatically couples the worm ring 270 to the shaft 231 to drive it at the low speed. In order to avoid the possibility of breakage of the parts should an excessive strain be thrown upon the low speed drive, the worm ring 270 may be connected to the sleeve 272 of the overrunning clutch by a slip connection, which, as shown in Figure 4, may comprise a ring 273 engaging the inner face of the worm ring 270 and pressing its conical inner face against a mating face of the outer overrunning clutch sleeve 274, as by the coil springs 275 surrounding bolts 276 which pass through the ring 273 and are threaded into a sleeve 277 journaled on the shaft 231. It is preferable to interpose a clutch between the overrunning clutch sleeve 272 and the shaft 231 in order that this low speed drive may be disconnected from the shaft 231 to facilitate turning this shaft by hand as may be desirable in adjusting the various cams carried by the drums fixed to the cam shaft 120. The outer face of the sleeve 272 which is loose on the shaft 31 may therefore be formed with clutch faces cooperating with faces on a clutch collar 280 which is keyed as by the key 281 to the shaft 231. An actuating lever 282 for this clutch may be provided, this lever being shown as having an actuating handle portion 283 by which it may be thrown. As shown best in Figure 2 this clutch actuating lever 282 may be connected for actuation on the opposite side of the machine through the rod 284 having a handle 285a at the back face of the machine adjacent to the oppositely positioned hand wheel 285. At opposite ends of the shaft 231 hand wheels such as 285 may be attached to facilitate turning the shaft 231 by hand when desired. Under normal operation of the machine the worm gear 270 is driven at its slow speed all the time, and when the high speed drive is unclutched this low speed drive serves to actuate the rotation of the cam shaft 120. When the high speed clutch is closed the cam shaft 120 is driven at the higher speed, the shaft 231 overrunning the rotation of the ring worm 270. The control between the high and low speeds of the cam shaft is determined by throwing the clutch collar 214, which has already been described as being effected by cams on the end cam drum 226.

Stock feeding mechanism

During the indexing of the drum the heads 65 of the various stock feeders ride for the greater portion of their paths between arcuate track member 300 and a disk 301, the track members 300 engaging the inner faces of the heads 65 and the disk 301 overlapping their outer ends. The disk 301 is carried by the shaft 18 and the track members 300 are carried by the stationary bars 302 which are fixed to the end frame member 5. For the more intricate types of work where eight tooling stations are required, provision is made by which the stock is fed at one station only but for machining the simpler types of work it may be possible to complete the cycle of operations on each piece within a less number of stations, as, for example, four. The machine of this invention is so designed that it can be operated as an eight spindle machine, all eight stations being required to complete the machining operations, or it can be operated to perform two complete cycles at each complete rotation of the cam drum then being what may be termed a double four machine, the work being fed forward at two stations diametrically opposite to each other. The arcuate members 300 are arranged with their adjacent ends spaced apart sufficiently to permit axial movement of a work feeding head 65 therebetween. The heads 65 are normally in their outward positions but during the feed the head is moved inwardly carrying the stock toward the rotary tool slide 81 against a work stop which will be further described. In order to permit the stock to be fed, the collet is released. For this purpose, the actuating arm 62 carrying the shoe 61, hereinbefore described, is positioned at the stock feeding station. As shown best in Figure 9 the arm 62 is a portion of a U shaped lever 290 vertically pivoted between the upper and lower frame members 3 and 4 at 291 and 292. Its upper arm 293 carries a lateral extension 294 (see Figure 27) at the end of which is a cam follower roll 295 actuated by suitable cams on a cam drum 296 carried by the cam shaft 120. When the head 65 approaches the stock feeding station it passes within a slot 306 in an actuating block 307 carried by a rod 308. Where one stock feed only is desired, only one of these rods 308 will be provided, this being shown as at the lowest station in Figures 1 and 10. Where two feeding positions are desired another actuating block and rod 308 will be provided, this being shown at the uppermost station in Figures 26 and 28, and the upper arm 293 is also provided with a collet actuating shoe 297 as shown in Figure 27. The shoe 297 is omitted when the machine is operated as a single eight spindle machine. The rod or rods 308 are slidably mounted through the frame member 5 and at their outer ends have fixed thereto coupling blocks 310 perforated to slidingly receive pull rods 311, each of which supports a coil spring 312 reacting between the block 310 and a washer 313 held in place by a nut 314 threaded onto the outer end of the rod 311. The rod 311 passes through an opening through the frame member 5 and through the slotted extremity of an arm 320 which forms a portion of a U-shaped rocker member 321 fulcrumed at 322 and 323 in the upper and lower frame members 3 and 4. Where stock feeding is done at the lower station only there is no feed actuator for connection to the upper arm 320, this being shown in Figure 10. The upper arm 320 carries a cam follower roll 325 which is actuated by suitable cams on a cam drum 326 also carried by the cam shaft 120. After each indexing operation and when a head 65 of the work feeder is in position with reference to the actuating block the rocker 321 is actuated by the cam to produce a feed motion of one, or where the double four arrangement is used, two work holders. The cams for actuating the rocker 321 are so designed as to give a slight overthrow of the stock so as to insure the stock being moved up against the stops, the spring 312 yielding to permit this action. The engagement of the heads 65 between the segments 300 and the disk 301 insure against axial movement of the heads 65 except when this action is desired. In order to return the stock feeder when the rocker 321 is returned, the rod 311 is provided with a pair of check nuts normally bearing against the block 310 opposite to the spring 312.

In order to permit withdrawal of the stock feeders when the stock is exhausted so as to permit a new piece of stock to be inserted therein it is desirable that the stock feeders be removable entirely from the machine. For this purpose the disk 301 is provided with one or more cut-out portions 330 in its periphery, one being employed where the machine is run with the eight spindle cycle and two being employed where the machine is run as a double four. The disk 301 is in normal operation secured to the shaft 18 with these cut-away portions out of registry with the heads 65, as is shown in full lines in Figures 10 and 26, but by releasing this holding means, which preferably is a set screw, the disk may be turned into the dotted line position so that when the heads 65 approach their feeding position they may be pulled out bodily from the machine and the stock inserted after which they may be returned to operative positions.

Where the machine is run with the eight spindle cycle a single work stop is sufficient to limit the forward feed of the stock at each actuation of the feeder. Referring to Figure 30, the stop 340 is shown as carried at the end of a crank arm 341 fixed to a rock shaft 342. This rock shaft is slidably journaled in the tool slide 82 and has keyed thereto a sleeve 343 connected through a rocker arm 344 to an upwardly extending link 345. As shown best in Figure 29 this link 345 is pivoted to one arm of a lever 346 the opposite end of which is connected through a link 347 with a lever 348. This lever 348 is fulcrumed at 349 on the upper frame member 3 and carries at its inner end a cam follower roll 350 riding in a cam groove 351 of a face cam 352 secured to the cam shaft 120. By this means the rock shaft 342 is moved at the proper time to bring the stock stop 340 into axial alinement with the stock which may then be fed into contact therewith. As soon as this feeding has been effected and the collet actuated to grip the stock the stock stop is rocked out of the way by the action of the cam. The rear end of the rock shaft 342 is supported in an offset arm 355 fixed to a shaft 356 carried by the inner wall of the frame member 8.

Where the machine is operated as a double four a second stock stop shown in dotted lines in Figure 30 and in full lines in Figure 29 may be employed, the two being connected by a link 360 and the upper being connected to the lever 346.

Special attachments

Figure 7:
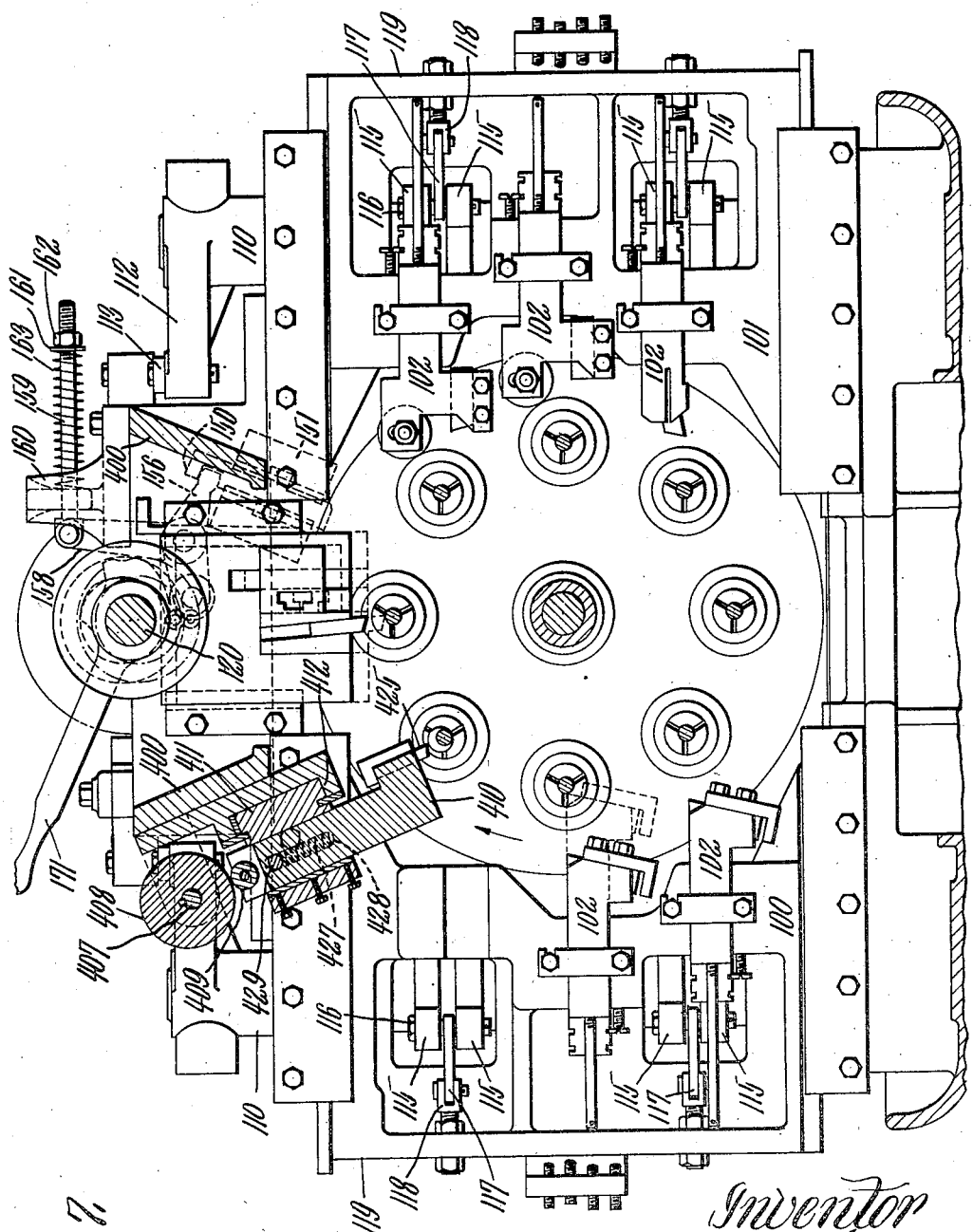

The upper frame member 3 is shown as provided with downwardly and inwardly slanting side walls 400 to which may be attached various mechanisms for producing special cuts on the work. One such mechanism is illustrated in Figures 1, 6 and 7. It comprises a base member 405 having journaled in spaced posts 406 extending outwardly therefrom a shaft 407 on which may be fixed a contour cam 408 herein shown as eccentric. This cam bears against a cam follower roll 409 carried by a sliding tool bar 410. This tool bar is mounted to slide axially on a block or carriage 411, which in turn, is mounted for sliding movement substantially parallel to the drum axis on ways 412 carried by the base 405. This block or carriage 411, as shown in Figure 1, is provided with an extension 415 having a boss 416 thereon through which is threaded a rod 416a which is secured at its outer end in an upwardly extended portion 417 (see Figure 6) of a cap 418 secured over the pedestal cap of the journal for one of the tool spindles as 84a, by the two bolts 419 which secure the pedestal and the extension block in position. Thus as the tool slide 82 is moved axially it carries with it the block 411 and its tool bar 410 thus to cause a tool 425 carried thereby to traverse the work. The tool bar is held with its cam roller 409 in contact with the cam 408 as by means of springs such as 427 seated in sockets 428 in the block 411 and bearing on a pin 429 extending transversely through the upper portion of the tool bar 410. The shaft 407 carrying the cam 408 is driven in timed relation to the rotation of the work and this is shown as done by means of a sprocket chain 435 passing about a sprocket wheel 436 fixed to the shaft 20 and a sprocket wheel 437 fixed to the shaft 407. Thus work at the station shown at 84a in Figure 6 will have a portion of its contour cut eccentric where an eccentric cam 408 is employed. This fixture is used in lieu of the top tool which might be carried by the front slide 119.

It is also possible to provide for axial movements of the rotary tools different from that produced by motion of the slide 82. Two tools arranged in this manner are illustrated in Figure 3. Referring to this figure, at 450, 451 are shown a pair of levers each fulcrumed on the machine frame as at 452 and 453, respectively. The lever 450 carries at its upper end a cam follower 454 which may be controlled by cams on a drum 455 carried by the cam shaft 120. The lever 451 may be controlled in a similar manner by cams on a cam drum 456 through a link 457 and a lever 457°. The lower end of each lever may be connected to an adjustable link 458, 459 shown threaded for the purpose of adjustment to blocks 460 and 461 secured to the desired work spindle shafts. Instead of connecting the lever 451, as shown in Figure 3, a lever 465 fulcrumed at 466, as shown on Figure 25, may be placed on the other side of the machine from the lever 450 and have a cam follower roll 467 actuated by cams on the drum 456. Such individual axial control of the tool spindles is particularly suitable for drilling, the drills being made to bore holes in the ends of the stock at a faster rate than tools which may be carried by other of the work spindles. For example, with the set up of the machine herein illustrated using the eccentric contour attachment, work such as is shown in Figures 17 to 24 in the eight spindle cycle may be made. In Figure 17 the stock is shown as spot drilled by the drill 500 in its outer end and the adjacent end portion partly turned as by the tool 501, this being done at the first station at which the stock was fed by the feeding device and at the bottom position of the work drum. At the next indexed position, as at Figure 18, a drill 502 carried by one of the rotary tool spindles and fed inwardly at a relatively fast rate has partly drilled in the work, the side turning from the adjacent end is carried further by the tool 503 carried by the front tool slide, and a forming tool 504 cuts away a portion back from the end of the work. At the next station, as shown in Figure 19, a drill 506 drills deeper into the stock, a portion is finish turned by the tools 507, 508 on the front tool slide, and a forming tool 509 on the back tool slide has performed further work. The next station is shown in Figure 20. A drill 510 here goes deeper into the work, its outer end is beveled by the tool 511 on the back tool bar and the tool 410 of the cam contour attachment turns an eccentric portion 512. The next station is shown in Figure 21. A drill 515 deepens the central bore and tools 516, 517 carried, respectively, by the front and back tool slides operate on the work. At the next station a drill 520 carries the central bore even deeper, and while the work is supported from the back by a support 521 carried by the back tool slide, a shaving cutter 522 carried by the front tool slide gives the final finishing cut to one portion of the work. At the next station, as shown in Figure 23, a reamer 523 reams out the hole, a counter sink 524 operates on the end of the work and a shaving tool 525 carried by the front tool slide finishes other portions of the work surface while they are supported from the rear by the supports 526 carried by the back tool slide. At the last station the outer end of the work is threaded as by the die 530 and the work is then cut off by the cutting tool 531, being then complete. At the next station, which starts a new cycle of operations the work is fed forward again and the operations shown in Figure 17 are performed thereon.

Of course work of many other types can be turned out by properly tooling up and adjusting the machine to suitable cycles of operation.

From the foregoing description of certain embodiments of this invention it should be evident to those skilled in the art that various changes and modifications might be made without departing from the spirit or scope of this invention as defined by the appended claims.

I claim:

1. In a machine of the class described, a drum rotatable about an axis, a plurality of devices carried by said drum and arranged in circular series about said axis, a rotary shaft arranged parallel to said axis, cooperating elements on said shaft and drum for causing rotation of said shaft to index said drum to bring said devices serially into one position, a latch for locking said drum in indexed position, a cam carried by said shaft for releasing said latch when said drum is to be indexed, a cam journaled on said shaft for releasing said latch when turned to one angular position, and a handle carried by said journaled cam by which it may be turned.

2. In a machine of the class described, a tool slide, a plurality of rotary tools carried by said slide, a rotary shaft to which each of said tools is slidably connected, a cam shaft for controlling the position of said slide, a drive shaft, operative connections between said drive and cam shafts, and operative connections from said drive shaft including an endless band operatively engaging each of said rotary shafts for rotating said tools.

3. In a machine of the class described, a rotatable turret, a plurality of work holders arranged in circular series about the axis of said turret, a carriage movable axially of said turret, a plurality of rotary tool holders carried by said carriage, a cam shaft for indexing said turret and for controlling the position of said carriage, a drive shaft, operative connections between said drive shaft and said cam shaft, and operative connections from said drive shaft including an endless band in operative engagement with said tool holders for rotating said tool holders.

4. In a machine of the class described, a plurality of rotatable spindles arranged in circular series, a rotary shaft parallel to the axis of said series, a tool slidably and non-rotatably carried by each spindle, a carriage movable axially of said spindles and rotatably supporting said tools against axial movement relative thereto, and an endless driving connection from said shaft to said spindles in position to cause certain of said spindles to be rotated in opposite directions.

5. In a machine of the class described, a bed, a carriage, a plurality of tools supported by said carriage, a rotary spindle for each tool, means for moving said carriage axially of said spindles, a drive pulley for each spindle axially stationary during movement of said carriage, a rotary shaft, and an endless driving connection from said shaft to all of said drive pulleys.

6. In a machine of the class described, a frame comprising upper and lower spaced parallel guide portions, a drum rotatable on a horizontal axis between said guide portions, a carriage slidable between said guide portions axially of said drum, a plurality of work holders carried by said drum and arranged in circular series about said axis, a plurality of tool spindles carried by said carriage in circular series corresponding to said series of work holders, a rotary shaft journaled in said upper guide portion, cooperating elements on said shaft and drum for causing rotation of said shaft to index said drum to bring said work holders serially into opposed relation to each tool spindle, cam means on said shaft for controlling the position of said carriage, a main drive shaft, high and low speed driving connections from said main shaft to said rotary shaft, and driving connections from said drive shaft including an endless band in driving relation to all of said tool spindles.

7. In a machine of the class described, a drum rotatable about a substantially horizontal axis, a plurality of work holders for bar stock carried by said drum and arranged in circular series about said axis, a device movable axially of the stock for feeding said stock to each holder, a rotary shaft above said drum, connections from said shaft for indexing said drum, a U-shaped lever vertically pivoted axially of its base and having its arms extended adjacent to diametrically opposed work holders in any indexed position of said drum, a cam on said shaft for rocking said lever, and connections from one or both of said arms for actuating said feeding device selectively at one or a pair of oppositely disposed indexing stations.

8. In a machine of the class described, a frame, a rotatable work holder, a member carried by said frame and movable parallel to the axis of rotation of said holder, a tool bar carried by said member and movable toward and from work carried by said work holder, cam means for controlling the position of said bar, means for controlling the position of said member, and means for driving said work holder and cam means in timed relation to cause a tool on said bar to cut the work in accordance with the contour of said cam.

9. In a machine of the class described, a rotatable drum, a rotatable shaft journaled in said drum, a plurality of rotary work holders carried by said drum in circular series about said shaft, means for rotating said work holder by the rotation of said shaft, means for indexing said drum to bring said work holders successively into a definite position, a frame member adjacent to said drum, a tool bar movable on said frame member toward and from work carried by a work holder in said definite position, a rotary cam for controlling the position of said bar, and driving connections from said shaft to said cam.

10 In a machine of the class described, a drive shaft, a drum in which said shaft is journaled, a plurality of rotary work holders carried by said drum in circular series about said shaft, driving connections from said shaft to said work holders, a cam shaft, cooperating elements on said cam shaft and drum for causing rotation of said cam shaft to index said drum to bring said work holders in succession into a predetermined position, a frame, a member movable on said frame axially of said drive shaft, a tool bar carried by said member for movement from and toward work in a holder in said position, a rotary cam for controlling the movement of said bar, driving connections to said cam from said drive shaft to cause said cam to control the contour of work cut by a tool on said bar, and cam means on said cam shaft for controlling the movement of said member.

11. In a machine of the class described, a drive shaft, a drum in which said shaft is journaled, a plurality of rotary work holders carried by said drum in circular series about said shaft, driving connections from said shaft to said work holders, a cam shaft, cooperating elements on said cam shaft and drum for causing rotation of said cam shaft to index said drum to bring said work holders in succession into a predetermined position, a frame, a member movable on said frame axially of said drive shaft, a tool bar carried by said member for movement from and toward work in a holder in said position, a rotary cam for controlling the movement of said bar, driving connections to said cam from said drive shaft to cause said cam to control the contour of work cut by a tool on said bar, a carriage movable axially of said drive shaft, cam means on said cam shaft for controlling the movements of said carriage, and connections from said carriage for controlling the movements of said member.

FRANK L. CONE.